Patented Apr. 23, 1940

2,198,210

UNITED STATES PATENT OFFICE 2,198,210

STABILIZATION OF HYDROCARBON, GLYCERIDE AND ESSENTIAL OILS BY SUBSTANTIALLY CRUDE UNREFINED CANE AND BEET SUGAR

Sidney Musher, New York, N. Y., assignor to Musher Foundation Incorporated, New York, N. Y., a corporation of New York No Drawing. Application January 3, 1939, Serial No. 249,166

11 Claims. (Cl. 87—9)

This invention relates to the stabilization of organic materials and particularly those comprising hydrocarbon, essential or glyceride oils and desirably when the materials are subjected to a treatment at elevated temperatures.

An object of this invention is the stabilization of organic materials and particularly of oils or compositions containing them by inexpensive, easily utilizable, and effective means.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is preferably used substantially crude unbleached cane sugar and desirably in crystalline and sterilized form.

Crude cane sugar as obtained from the sugar cane is crystallized out following a mild lime treatment in order to raise the pH of the sugar to about 7.5 although the mother liquor left after crystallization reverts easily to a pH of about 6.0. It is desirable to avoid this treatment in order to retain to the fullest extent the stabilizing properties of the sugar. By omitting the lime treatment, a more potent stabilizing sugar is obtained.

The preferred stabilizing sugar may be made by dissolving the crystallized crude sugar occurring as large crystals in water, filtering through a non-bleaching earth to remove dirt and other extraneous and objectionable matter and where necessary, heating to 180° F. for 5 minutes to sterilize. The syrup thus obtained may be recrystallized and the crystals will be small, of pale yellow or brown color.

When the crude sugars are subjected to any refinement such as to treatment with charcoal, bone black, bleached, etc., and processed as in the manufacturing of refined cane sugar, household brown sugar, etc., they are of no value as stabilizers and may not be successfully utilized therefor, and it is therefore important to omit these bleaching procedures.

Among the classes of materials that may be treated in accordance with this invention are the aqueous materials and particularly those existing in the form of oil-in-water emulsions such as dairy emulsions including milk, cream, condensed milk, ice cream, etc., mayonnaise, etc.

Example I

To milk susceptible to the development of oxidized flavors was added

A. 1.0% of crude cane sugar after having been clarified by filtration and recrystallized.

B. 1.0% of refined cane sugar.

The milks were examined for oxidized flavor development after standing at 50° F., the number of + signs indicating the degree of oxidized flavor.

|  | After— | | |
| --- | --- | --- | --- |
|  | 24 hours | 48 hours | 72 hours |
| Milk A | − | + | ++ |
| Milk B | + | ++ | +++ |

The amount of crude sugar needed to stabilize milk and similar products depends upon such factors as the degree of protection desired, the amount of sugar or sweetness normally present, etc. In the case of dairy products, for example, from 0.1% to 15.0% of the crude sugar may be added, and it may be used either in its entirety or in partial replacement for refined cane sugar.

In mayonnaise, the crude sugar will generally replace entirely the refined sugar normally used or be used in the amount of 1.0% to 3.0%, for example.

In confections, beverages, etc., the crude sugar may be used in amounts of from 0.5% to 15% of the weight of the confection.

Example II

An ice cream mix contaminated with 2 p. p. m. of $CuSO_4$ was prepared

A. With 10% refined cane sugar.

B. With 5% refined sugar and 5% crystallized crude cane sugar.

The mixes were flavored with strawberries, frozen, stored at 15° F. and observed for oxidized flavor development.

|  | After— | | |
| --- | --- | --- | --- |
|  | 2 weeks | 4 weeks | 8 weeks |
| Ice cream A | ++ | +++ | ++++ (inedible) |
| Ice cream B | ± | + | ++ |

The crude sugars may also be used in the treatment of oily materials such as the glyceride oils including lard, cocoanut oil, cottonseed oil, soya oil, sesame oil, fish oils, fish liver oils, oils for the soap, textile and leather industries, etc., the essential oils including the flavoring oils such as oil of orange, oil of lemon, oil of peppermint, etc., and the perfume oils including both the naturally extracted or expressed and the synthesized materials, and the hydrocarbon oils including mineral white oil, hydrocarbon distillates, lubricating oils, and so forth, in all of which cases oxidation is markedly retarded.

Example III

To lard was added 5% of crude cane sugar, said sugar not having been subjected to any lime treatment. This lard was compared with the same lard untreated and with another sample of lard to which was added 5% of refined cane sugar.

Samples of the lards amounting to 25 cc. each were placed in 50 cc. beakers, exposed to room temperature in indirect light and tested for peroxide values at weekly intervals.

|  | After— | | | |
|---|---|---|---|---|
|  | 0 weeks | 1 week | 2 weeks | 3 weeks |
| Untreated lard | 1.2 | 13.5 | 35.0 | 120 |
| Lard containing 5% crude sugar | 1.2 | 3.5 | 8.8 | 22 |
| Lard containing 5% refined sugar | 1.2 | 12.8 | 36.5 | 112 |

As an example of a composition containing an essential oil such as orange oil readily susceptible to oxidation:

Example IV

An orange flavored dessert powder was prepared with oil of orange and gelatin using refined cane sugar in one case and clarified crude cane sugar in another. The desserts were packed and held for 60 days at room temperature and examined. The dessert powder containing the crude sugar still retained its fresh orange aroma and flavor, whereas that made with the refined sugar had developed an "off" terpene type odor and was noticeably lacking in freshness.

The crude sugars described may also be used to advantage in curing operations such as in the curing of meats and fish, and for other purposes where stabilization is required.

Where the crude sugar is clarified and recrystallized for purposes of sterilization, it is highly desirable for the antioxidant values left in the liquor or washings from the clarified and recrystallized sugars to be recombined with said clarified, recrystallized sugar. This may be done by merely adding this liquor or washings, with further treatment or concentration, to the recrystallized crude sugar, followed by drying, or the clarified crystallizable mixture after evaporation may be permitted to crystallize without separation of the mother liquor or with removal of a part of the mother liquor. This modified crude sugar possesses considerably more stabilizing power than the crystallized crude sugars free of the values in the liquor or washings.

Example V

To cream containing 32% butterfat was added 2 p. p. m. of $CuSO_4$ and
A. 5% clarified and recrystallized crude cane sugar with removal of the mother liquor.
B. 5% clarified and crystallized crude cane sugar modified as above with retention of all of the mother liquor.

The creams were placed into storage for 4 weeks at −10° F. at the end of which time they were removed, made into strawberry ice cream, and tested for oxidized flavor development.

|  | After— | | |
|---|---|---|---|
|  | 1 week | 2 weeks | 3 weeks |
| Ice cream made with cream A | − | ++ | +++ |
| Ice cream made with cream B | − | − | − |

Example VI

A fatty mackerel was split. One side (A) was heavily salted with an equal weight of salt containing 5% of refined cane sugar. The other side (B) was salted as above except that the salt contained 5% of clarified crude cane sugar with the mother liquor retained. The sides were kept at room temperature and observed for rancidity at regular intervals. The side (A) was noticeably "off" in color within 15 days and rancid within 22 days. The side (B) remained good in color and showed no rancidity for the duration of the experiment of 30 days.

It is particularly desirable for the crude sugars to be subjected to elevated temperatures after dispersing in the oxidizable materials in order to develop much more markedly beneficial results. The results obtained when the crude sugar is heated after dispersing in the oxidizable material are surprising in view of the normal expectation, that keeping quality and inhibiting activity would be reduced at elevated temperatures.

The heat treatment may be carried out at temperatures as high as 300° F. to 400° F. or higher and the heated materials may be immediately allowed to cool or heated for periods up to 5 or 10 minutes or more in order to produce the desired interaction between the crude sugar and the oxidizable material.

Example VI

To cod liver oil was added
A. 1% crude cane sugar.
B. 1% crude cane sugar and heated in the oil to 400° F. for 10 seconds.
C. 1% refined cane sugar.
D. 1% refined cane sugar and heated in the oil to 400° F. for 10 seconds.

In Examples A and C the oil was heated to 400° F. for 10 seconds before addition of the sugar and not heated afterwards. The oils were then tested at 208° F. with air bubbled through samples of them until the rancid point was reached.

|  | Rancid after— |
|---|---|
| Cod liver oil A | 5 hours |
| Cod liver oil B | 45 hours |
| Cod liver oil C | 2 hours |
| Cod liver oil D | 2 hours |
| Control cod liver oil | 2 hours |

Example VII

To refined bleached lard was added
A. 2% syrup or mother liquor residue from the washing and crystallization of crude cane sugar, such residue containing approximately 92% total carbohydrate material, and heated in the lard to 400° F. for 5 minutes.
B. Same as A without the heat treatment.
The samples were tested as in Example VI.

|  | Rancid after— |
|---|---|
| Lard A | 27 hours |
| Lard B | 4 hours |
| Control lard | 1½ hours |

Essential oils, perfume oils, hydrocarbon waxes, paraffins, distillates, lubricating oils, etc., rubber, and other similar types of organic materials or compositions comprising them and subject to oxidation may also be treated in the same manner to stabilize them.

Example VIII

To the essential oil of orange as freshly prepared was added 0.5% of crystallized raw cane sugar, and heated in the oil to 300° F. for 5 minutes. The oil was then compared with untreated oil after storage at room temperature for 3 months in an open container.

|  | After— | | |
|---|---|---|---|
|  | 1 month | 2 months | 3 months |
| Untreated oil | Slightly off | Off in odor and flavor. | Bad terpene odor and flavor. |
| Treated oil | O. K. | O. K. | Slightly noticeable off odor. |

The heat treatment may reach as high as 500° F. or higher but will depend upon the flash point of the oil and other practical considerations. Generally a heat treatment of 400° F. is desirable for oils such as the glyceride oils, essential oils, etc., and in the case of the vitamin oils such as cod liver oil, halibut liver oil, etc., a heat treatment of 300° F. to 350° F. is desirable.

In all of these cases, a heat treatment of 350° F. to 400° F. will noticeably char or burn the crude sugars in the oils or similar materials, but this charring or burning is necessary in order to produce the desired interaction.

It is not possible merely to heat the crude sugar alone before addition to the oil and then add it to the oil, for the desired effect will not be attained under those circumstances. It is evident, therefore, that when the crude sugar or the uncrystallized mother liquor residues, which are included in the term "crude sugar", or mixtures of the two are heated in the oils, they do not merely act as negative oxidation catalysts in the same manner as ordinary antioxidants, such as hydroquinone, but react with the oxidizable material to produce the stabilization.

It is even desirable for the heating to be conducted in the entire body of oxidizable material and not in any small fraction thereof. The maximum stabilizing effects are obtained only when the heating is conducted using the entire mass of oil or other material to be stabilized indicating further the reaction obtained by the heat treatment rather than negative catalysis.

Example IX

Cod liver oil was treated
A. By mixing 5% of crude clarified cane sugar containing the mother liquor and heating to 370° F. for 5 minutes.
B. By heating the cod liver oil to 370° F. for 5 minutes alone, cooling, and then adding 5% of the sugar used in A which had been heated alone (not in the oil) to 370° F. for 5 minutes.
C. By heating a mixture of equal parts of the cod liver oil and the sugar used in A to 370° F. for 5 minutes, cooling, and then adding the balance of the cod liver oil to reduce the sugar content to 5%, said added cod liver oil having been heated alone to 370° F. for 5 minutes.
The oils were tested as in Example VI

|  | Rancid after— |
|---|---|
| Control cod liver oil (heated to 370° F. for 5 minutes) | 4 hours |
| Cod liver oil A | 72 hours |
| Cod liver oil B | 3¾ hours |
| Cod liver oil C | 8 hours |

Following the heat treatment, the undissolved charred and burnt residues may be filtered or otherwise removed from the oils or other stabilized materials as they appear to play no further part in the stabilizing process.

In some cases only a moderately high heat is sufficient to produce the necessary interaction and subsequent stabilization. For example, in the case of many compositions comprising oxidizable materials a 400° F. heat treatment would char, or burn the material or produce other objectionable results.

Such products containing the crude clarified sugar and/or its mother liquor may be heated to such moderately high temperatures as between 150° F. and 250° F. and preferably over 190° F. for periods of 5 seconds upwards in order to obtain a marked improvement in keeping quality.

For these products the crude sugar may be used in its entirety or only to the extent of a portion of the sugar normally used in the composition requiring stabilization. The amount of crude sugar present may vary to the extent of from 0.1% to 20%, dependent upon the degree of protection desired and the particular product treated.

Example X

A strawberry ice cream mix was prepared using readily oxidizable cream and with
A. 5% of clarified raw cane sugar containing the mother liquor and 10% refined cane sugar.
B. 15% refined cane sugar.
The mixes were then heated to 150° F. for 10 minutes, made into ice cream, and the ice cream was left standing at 10° F. The results are given below, the number of + signs indicating degree of oxidized flavor.

|  | After— | | |
|---|---|---|---|
|  | 4 weeks | 8 weeks | 12 weeks |
| Ice cream A | − | + | ++ |
| Ice cream B | + | +++ | ++++ (inedible) |

Example XI

Raspberry, orange and lemon syrups were prepared with clarified raw cane sugar containing the mother liquor in replacement for refined cane sugar normally used. The syrups were heated to 215° F. during the concentrating process. They were then set aside at room temperature for 60 days and used in the preparation of a candy filler between two wafers. Organoleptic results on the wafers follow based upon a perfect flavor score of 100.

|  | After— | | |
|---|---|---|---|
|  | 0 weeks | 4 weeks | 8 weeks |
| Rasberry raw cane | 95 | 90 | 85 |
| Rasberry refined cane | 90 | 85 | 75 |
| Orange raw cane | 85 | 85 | 75 |
| Orange refined cane | 75 | 65 | 50 |
| Lemon raw cane | 85 | 80 | 75 |
| Lemon refined cane | 80 | 65 | 60 |

*Example XII*

Cream containing 35% butterfat was mixed with
A. 10% raw cane sugar, heated to 180° F. for 5 minutes; then frozen at —10° F.
B. 10% raw cane sugar, the cream having been heated to 180° F. for 5 minutes before the sugar was added; then frozen at —10° F.
C. 10% refined cane sugar, heated to 180° F. for 5 minutes; then frozen at —10° F.

The cream was stored for 4 months, then made into strawberry ice cream and observed for oxidized flavors.

|  | Degree of oxidized flavor after— | | |
|---|---|---|---|
|  | 0 days | 10 days | 20 days |
| Made with sugar A | — | — | ± |
| Made with sugar B | ± | ++ | ++ |
| Made with sugar C | ++ | +++ | ++++ (inedible) |

Since the heat treatments of 350° F. and higher give so much more marked stabilizing effect, those treatments are far more preferable to the moderate heat of from 160° F. to 250° F.

Under these conditions, wherever the oil may be heat treated at about 400° F. prior to incorporation in the finished composition, that is desirable. For example, cocoanut oil should desirably be treated with from 0.1% to 3% of raw cane sugar at about 400° F. for 10 minutes before addition to food or other products.

For food products it is desirable that the sugar used be as bland in flavor and as light in color as possible. For this reason it is desirable to use the crystallized crude cane sugar and particularly the crystallized and clarified crude cane sugar with or without the mother liquor, and which is not subjected to any charcoal bleaching or subsequent refining operations. Caramelization should also as far as possible be avoided although carbonization will frequently occur and is preferred for the maximum stabilizing results.

The various grades of refined sugar including ordinary refined cane sugar, granulated sugar, powdered sugar, brown sugar, etc., do not possess the antioxygenic character of the crude raw sugar of the present application.

The crystallized and uncrystallized residues resulting after the clarification and vacuum evaporation of crude cane sugar syrups may however be used and they are particularly beneficial when employed at the elevated temperatures of about 400° F. where the charring of the sugar takes place and where charring would occur even if the lighter colored clarified raw cane sugar were to be used.

For food products that may not be subjected to temperatures of in excess of 250° F. the crystallized crude sugars are the most desirable. For other materials including the oils, and particularly the glyceride oils, the residues such as uncrystallized crude sugars or mother liquors may be employed. Such residues may contain as little as 80% total carbohydrates whereas the crude crystallized sugars contain in excess of 90% total carbohydrates. Emulsions may, for example, be prepared using these uncrystallized residue crude sugars with or without the addition of water or aqueous materials, the emulsions containing oils such as the vitamin oils, mineral oils, etc., in the disperse phase. Such emulsions should desirably be subjected to an elevated temperature such as to in excess of 200° F. in order to further enhance the vitamin-retaining or stabilizing properties of the oil and of the resultant emulsion.

If desired, the oil may be heated with a small quantity of the crude sugar residue liquor to about 400° F. before emulsification, and then this treated oil may be used in the production of the finished emulsion whereby substantial protection against vitamin loss and/or oxidation is obtained.

The uncrystallized residue or mother liquor obtained in the manufacture of crude crystallized sugar after separation of the crystallized material is a particularly effective stabilizer and its effectiveness is markedly increased under conditions of heat treatment in the oxidizable conditions.

In the treatment of vitamin oils such as cod liver oil to retard both rancidity and loss of vitamin A, this residue is particularly effective and markedly so when heated to elevated temperatures in the oil.

*Example XIII*

Cod liver oil was prepared with
A. 2% of crude cane sugar residue.
B. 2% of crude cane sugar residue heated in the oil to 375° F. for 10 minutes.

The oil was tested as in Example VI

|  | Rancid after— |
|---|---|
| Control cod liver oil | 3 hours |
| Cod liver oil A | 12 hours |
| Cod liver oil B | 114 hours |

This residue or mother liquor may be utilized with or without the crude crystallized cane sugar for addition in a small proportion to fish scrap prior to heating at a temperature of between 250° F. and 325° F. as in the manufacture of fish meal in order to retard subsequent rancidity of the fish meal. It may also be used in the rendering of hogs where elevated temperatures are employed, and in the drying of cereal grasses, which are heated to 250° F. at the time of drying, the crude sugar stabilizing those grasses against loss of vitamin A which otherwise is lost rapidly after drying.

Extracts of crude cane sugar may also be utilized, particularly as obtained by the use of a solvent having the formula XOH where X is a low molecular weight aliphatic group. For example, the ethyl alcohol soluble extract of raw cane sugar may be prepared by mixing equal parts by weight of alcohol and sugar, removing the undissolved portion, and distilling the alcohol. When extracts of that nature are employed as little as from 0.01% to 2% may be added to the oils, which oils are then preferably subjected to a heat treatment in order to enhance the stabilizing activity.

In addition to raw cane sugar which includes the raw sugar residues, the raw beet sugar which includes the raw sugar residues may similarly be employed. Raw beet sugar and its extracts and residues may be employed as stabilizers in an analogous manner to the use of the cane products. Under conditions of heat treatment such as with aqueous materials as in the nature of dairy products, confections, etc., at between 160° F. and 250° F. and with the oils at about 250° F. and preferably at about 400° F., these raw beet products become particularly effective stabilizing agents.

The various beet products include the raw beet sugar, the mother liquor or washings from the clarified raw beet sugar, the alcohol extracts of the raw beet sugar, etc.

*Example XIV*

Raw beet sugar was compared with refined beet sugar by adding to milk susceptible to oxidized flavors, heating that milk to 160° F. for 15 seconds, permitting the milk to stand at 50° F. and testing for oxidized flavor development.

|  | After— | | |
|---|---|---|---|
|  | 24 hours | 48 hours | 72 hours |
| Milk containing 1% raw beet sugar | − | ± | + |
| Milk containing 1% refined beet sugar | + | ++ | +++ |

Particularly where the raw cane and beet products are subjected to accelerated temperature treatments for the purpose of enhancing stabilizing activity, they may be further fortified by the addition of very small quantities of organic acids such as tartaric, citric, malic, succinic, etc., acids, lecithin, etc., phosphatides, phospholipins and phosphoric acid.

This application is a continuation in part of copending application, Serial No. 134,184 filed March 31, 1937.

Having described my invention what I claim is:

1. In an oil normally subject to oxidative deterioration selected from the group consisting of the hydrocarbon oils, glyceride oils and essential oils, substantially stabilized against deterioration, a stabilizing agent consisting of a relatively small proportion of a sugar selected from the group consisting of crude cane sugar, and crude beet sugar.

2. In an oil normally subject to oxidative deterioration selected from the group consisting of the hydrocarbon oils, glyceride oils, and essential oils substantially stabilized against deterioration a stabilizing agent consisting of a relatively small proportion of an organic material selected from the group consisting of crude cane sugar, crude beet sugar, and their alcohol soluble extracts, said organic material having been heated in the oil to an elevated temperature whereby the stabilizing action of the organic material is greatly enhanced.

3. A substantially stabilized oil normally subject to oxidative deterioration containing a small proportion of a crude cane sugar heated in the composition to in excess of 160° F. whereby marked enhancement of stabilizing activity is obtained.

4. A substantially stabilized oil normally subject to oxidative deterioration containing a small proportion of a crude sugar, said sugar having been heated to about 400° F. in the oil.

5. A substantially stabilized edible glyceride oil normally subject to oxidative deterioration containing a small proportion of a crude cane sugar, said sugar having been burnt in the oil by heating at about 400° F.

6. A process of rendering an oil more resistant to the development of oxidative deterioration which comprises adding to and dispersing in said oil a relatively small amount of a crude sugar containing over 90% water soluble carbohydrate and then heating to an elevated temperature ranging from about 300° F. to 500° F. for a period of at least about 5 to 10 minutes, said oil being substantially stabilized against oxidative deterioration and said stabilizing action being enhanced by the heat treatment.

7. A process of rendering an oil highly resistant to the development of oxidative deterioration which comprises mixing in the oil about 5% of a crude clarified cane sugar containing the mother liquor, heating to an elevated temperature of at least about 250° F. to char the sugar and then filtering out the charred sugar material, said oil being substantially stabilized against oxidative deterioration and said stabilizing action being enhanced by the heat treatment.

8. In an edible glyceride oil normally subject to oxidative deterioration, substantially stabilized against deterioration, a stabilizing agent consisting of a relatively small proportion of a sugar selected from the group consisting of crude cane sugar and crude beet sugar.

9. In a hydrocarbon lubricating oil normally subject to oxidative deterioration, substantially stabilized against deterioration, a stabilizing agent consisting of a relatively small proportion of a sugar selected from the group consisting of crude cane sugar and crude beet sugar.

10. In an edible glyceride oil normally subject to oxidative deterioration, substantially stabilized against deterioration, a stabilizing agent consisting of a relatively small proportion of an organic material selected from the group consisting of crude cane sugar, crude beet sugar and their alcohol soluble extracts, said organic material having been heated in the oil to an elevated temperature whereby the stabilizing action of the organic material is greatly enhanced.

11. In a hydrocarbon lubricating oil normally subject to oxidative deterioration, substantially stabilized against deterioration, a stabilizing agent consisting of a relatively small proportion of an organic material selected from the group consisting of crude cane sugar, crude beet sugar and their alcohol soluble extracts, said organic material having been heated in the oil to an elevated temperature whereby the stabilizing action of the organic material is greatly enhanced.

SIDNEY MUSHER.